G. A. Meacham.
Button.
No. 2006
Reissued Jun 20. 1865.
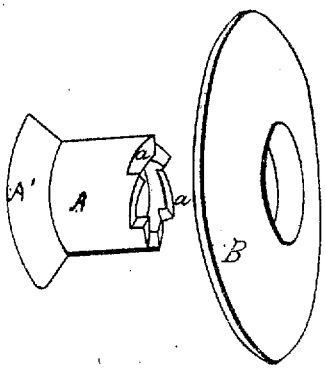
Fig. 1.
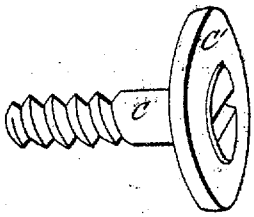
Fig. 3.
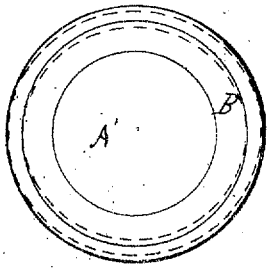
Fig. 2.
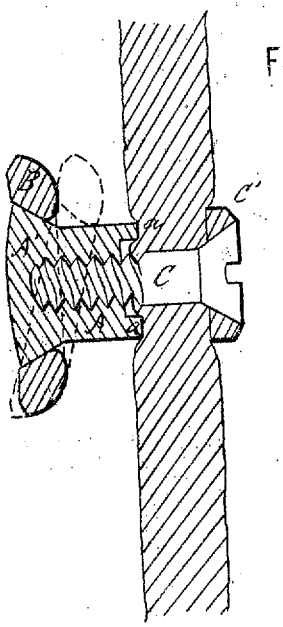
Witnesses.
G. H. Babcock
Benj. F. Willing
Inventor
Geo. A. Meacham

UNITED STATES PATENT OFFICE.

CHARLES SMART, OF NEW YORK, N. Y, ASSIGNEE, BY MESNE ASSIGNMENTS, OF GEO. A. MEACHAM.

IMPROVEMENT IN BUTTONS.

Specification forming part of Letters Patent No. 26,776, dated January 10, 1860; Reissue No. 2,006, dated June 20, 1862.

*To all whom it may concern:*

Be it known that GEORGE A. MEACHAM, of the city, county, and State of New York, did invent a certain new and useful Improvement in Buttons; and I, his assignee, declare the following to be a full and clear description of the same.

The object of this invention is to make a button that can be attached and detached from the cloth or garment without sewing, and at the same time have a revolving motion upon its shank, (or stem engaging in the shank through the cloth,) so as to facilitate the operation of passing the button through the button-hole in the garment with more ease and less liability of tearing it from the cloth than if secured thereto by sewing.

In the ordinary operation of buttoning a garment the button is always inclined more or less to enable its edges to enter the button-hole, and, as a natural consequence, where they are sewed to the cloth, the tendency is to twist or tear the eye of the button out or rend it from the cloth to which it is stitched.

This improvement aims to oviate these objections by making the button have a revolving motion upon its shank, or the stem engaging in the shank and fastening it to the cloth, so that in the effort to insert the button in the button-hole it may be inclined more or less, and twisted around to roll it (as it may be said) through the button-hole without in any way having a tendency to rupture the cloth to which the button is secured.

The nature of this invention consists, first, in the use of a button revolving upon a shank or stem secured through the cloth by means of the combination of a button-head working on a shank secured to the cloth or garment by a stem engaging in the shank, or equivaents therefor, so as to permit the button to lrotate on its axis and yet be firmly and durably attached to the cloth, and at the same time more easily buttoned, and with less strain upon it than if the button were secured to the cloth by sewing; and, secondly, in the employment of teeth at the base of the shank to prevent its turning round, though permitting the button to turn round upon it or the stem to turn round in the cloth.

But, to describe this invention more particularly, I may refer to the accompanying drawings, forming a part of this specification, the same letters of reference, wherever they occur, referring to like parts.

Figure 1 is a perspective view of the several parts before they are secured to the cloth. Fig. 2 is a section of a button and of the cloth to which it is firmly fixed. Fig. 3 is a face view.

Letter A is the shank, made of any suitable material. On its outer end is formed a head, A′, the under face of which is beveled or cut away outwardly, so as to adapt it to the rim or button proper. In the center of the shank is cut a female screw, as represented. Its base or end, which meets the cloth, is hollowed or recessed to a diameter somewhat greater than that of the screw, and the projecting edge *a* is toothed or notched, one side or face of each tooth being parallel to the axis of A, while the other is inclined, as represented in Fig. 1.

Letter B is the rim or button proper. It is hollowed out at its center, so as to adapt it to the head A′ of the shank and permit it to rotate freely thereon, and also assume a considerable angle relatively to the axis of A, while it is impossible to separate it therefrom. This angular position of B is shown in red lines in Figs. 2 and 3.

Letter *c* is a stem, on which is a loose washer, *c*′, the object of which is to form a bearing at the under or back side of the cloth or garment for the head of the stem *c* to draw against, instead of drawing directly against the cloth, when uniting the two parts of the button together, and thereby allow the stem to rotate in the cloth. This stem has a screw-thread cut on it, though any other suitable locking device may answer the same purpose for locking it into the shank A through the cloth D. The object of the stem is to unite or lock the head or button proper to the cloth by means of the shank.

In practice the shanks are all made of one size, and various-sized rims are made of the same or other material, and either plain or ornamental are used. Also, the buttons may be made of two pieces of metal, the upper or outer one forming a cap-plate and secured to the base or lower plate by turning over the edges of one of the plates over the edges of the other, and thus joining them together.

In operating this improved button the rim is, by the action of the fingers, made to assume the position shown in red lines in Fig. 2. Its edge is then inserted in the button-hole, and by the thumb and finger turned or rotated upon its axis, and in doing so is entirely passed through the button-hole without twisting or straining the cloth. When, buttoned, any slight twisting motion of the parts of the cloth containing the button-hole may turn the rim in the same direction, causing the wear to come upon the hard surfaces of the button, and not on the cloth or stitching around the button-hole.

The several parts of said button are very rapidly and cheaply produced by machinery and by the use of various kinds of materials, and of different colors.

Having now described said invention, I will proceed to set forth what is claimed and desired to be secured by Letters Patent of the United States:

1. A button revolving on its shank or stem by means of devices substantially as hereinbefore set forth.

2. The teeth *a*, arranged at the base of the shank A, substantially as and for the purpose hereinbefore set forth.

CHAS. SMART,
*Assignee, through mesne assignments, of George A. Meacham.*

Witnesses:
E. S. BOYNTON,
CHARES L. BARRETT.